United States Patent
Bhowan et al.

(10) Patent No.: US 10,521,608 B2
(45) Date of Patent: Dec. 31, 2019

(54) AUTOMATED SECURE IDENTIFICATION OF PERSONAL INFORMATION

(71) Applicant: Accenture Global Solutions Limited, Dublin (IE)

(72) Inventors: Urvesh Bhowan, Dublin (IE); Bogdan Eugen Sacaleanu, Dublin (IE); Navdeep Sharma, Dublin (IE); Gavin Kearney, Longford (IE); Laura O'Malley, Dublin (IE); Aoife Whelan, Dublin (IE); Qurrat Ul Ain, Dublin (IE); Anthony McCoy, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 178 days.

(21) Appl. No.: 15/866,171

(22) Filed: Jan. 9, 2018

(65) Prior Publication Data
US 2019/0213354 A1    Jul. 11, 2019

(51) Int. Cl.
*G06F 21/62* (2013.01)
*G06F 17/27* (2006.01)
*G06N 20/00* (2019.01)

(52) U.S. Cl.
CPC ........ *G06F 21/6254* (2013.01); *G06F 17/278* (2013.01); *G06F 17/2785* (2013.01); *G06N 20/00* (2019.01)

(58) Field of Classification Search
CPC ............ G06F 21/6254; G06F 17/278; G06F 17/2785; G06N 20/00
See application file for complete search history.

(56) References Cited

U.S. PATENT DOCUMENTS

| 9,396,179 | B2 | 7/2016 | Stavrianou et al. |
| 2011/0255688 | A1* | 10/2011 | Spalink ............... G06F 21/6254 380/29 |
| 2015/0286842 | A1* | 10/2015 | Mori ................... G06F 21/6245 726/30 |
| 2015/0317613 | A1* | 11/2015 | Clark ..................... G06Q 20/12 705/44 |

(Continued)

OTHER PUBLICATIONS

Kefron, "Data Masking & The GDPR: How will your business be affected?", Retrieved From https://www.kefron.com/blog/data-masking-gdpr-how-will-businesses-be-affected/., Published Nov. 2016. (Year: 2016).*

(Continued)

*Primary Examiner* — Chau Le
(74) *Attorney, Agent, or Firm* — Harrity & Harrity, LLP

(57) ABSTRACT

A device may obtain information included in a corpus of documents relating to an organization. The device may identify a set of values indicating personal information for one or more individuals by using a set of natural language processing (NLP) techniques to analyze the information included in the corpus. The device may determine a set of relationships between one or more values, of the set of values indicating the personal information using one or more additional NLP techniques and/or one or more rules. The device may generate a set of user profiles for the one or more individuals based on the set of relationships between the one or more values indicating the personal information. The device may perform one or more actions associated with using the set of user profiles to service a request for information.

20 Claims, 7 Drawing Sheets

(56) References Cited

U.S. PATENT DOCUMENTS

| | | | |
|---|---|---|---|
| 2016/0203336 A1* | 7/2016 | Nambiar | G06F 21/6254 |
| | | | 726/26 |
| 2016/0350342 A1 | 12/2016 | Donneau-Golencer et al. | |
| 2017/0279616 A1* | 9/2017 | Loeb | H04L 67/22 |
| 2018/0063182 A1* | 3/2018 | Jones | G06F 21/6218 |
| 2018/0332008 A1* | 11/2018 | Norman | H04L 63/0421 |
| 2019/0156060 A1* | 5/2019 | Maier | G06F 21/6254 |

OTHER PUBLICATIONS

Symantec Corporation, "Symantec Data Loss Pravention," https://www.symantec.com/products/data-loss-prevention, 6 pages, Dec. 19, 2017 print date.

BigID, "Satisfy EU GDPR Data Protection Requirements With Automation," https://bigid.com/eu-gdpr/, 3 pages, Dec. 19, 2017 print date.

Spirion, "GDPR Data Inventory and Monitoring," https://www.spirion.com/compliance/gdpr/, 5 pages, Dec. 19, 2017 print date.

\* cited by examiner

| Example User Profile ||
| --- | --- |
| Personal Data | Source |
| Name: John Doe | Doc ID 123, 124, 141 |
| Address: 1421 Tree Dr., Sierra VA | Doc ID 123 |
| Date of Birth: 7-3-1986 | Doc ID 123 |
| Email: jdoe@email.com | Doc ID 123, 124, 141 |
| IP addresses: 1.2.3.4 | Doc ID 179 |
| Bank Information: N/A | Doc ID 184 |

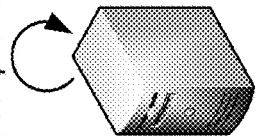

125
Generate
user profiles

Identification
Platform

FIG. 1C

| Additional NLP Techniques and Rules |
| --- |
| • Text Proximity |
| • Co-reference Resolution |
| • Proximity Evaluation |
| • Domain-specific Rule |
| • Organization-specific Rule |
| • Document-specific Rule |

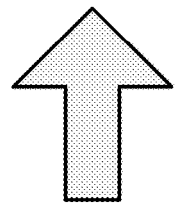

120
Determine relationships
between values indicating
the personal information Identification
Platform

100

AUTOMATED SECURE IDENTIFICATION OF PERSONAL INFORMATION

BACKGROUND

Personal information (e.g., personally identifiable information (PII), sensitive personal information (SPI), etc.) is information that may be used to identify, contact, and/or locate a single person. An organization may store personal information for customers, employees, and/or the like.

SUMMARY

According to some possible implementations, a device may obtain information included in a corpus of documents relating to an organization. The device may identify a set of values indicating personal information for one or more individuals by using a set of natural language processing techniques to analyze the information included in the corpus of documents. The set of natural language processing techniques may include at least one of: a first one or more natural language processing techniques associated with analyzing one or more unstructured documents of the corpus of documents, or a second one or more natural language processing techniques associated with analyzing one or more structured documents of the corpus of documents. The device may determine a set of relationships between one or more values, of the set of values indicating the personal information, by analyzing the information included in the corpus of documents and the set of values indicating the personal information using at least one of: one or more additional natural language processing techniques, one or more rules, or a knowledge graph. The device may generate a set of user profiles for the one or more of individuals based on the set of relationships between the one or more values indicating the personal information. The device may store the set of user profiles in an anonymized format. The device may perform one or more actions associated with using the set of user profiles to service a request for information.

According to some possible implementations, a method may include obtaining, by a device, information included in a corpus of documents relating to an organization. The method may include identifying, by the device, a set of values indicating personal information for one or more individuals by using a set of natural language processing techniques to analyze the information included in the corpus of documents. The set of natural language processing techniques may include at least one of: a first one or more natural language processing techniques associated with analyzing one or more unstructured documents of the corpus of documents, or a second one or more natural language processing techniques associated with analyzing one or more structured documents of the corpus of documents.

Additionally, the method may include determining, by the device, a set of relationships between one or more values, of the set of values indicating the personal information, by analyzing the information included in the corpus of documents and the set of values indicating the personal information using at least one of: one or more additional natural language processing techniques or one or more rules. The method may include generating, by the device, a set of user profiles for the one or more individuals based on the set of relationships between the one or more values indicating the personal information. The method may include performing, by the device, one or more actions associated with using the set of user profiles to service a request for information.

According to some possible implementations, a non-transitory computer-readable medium may store one or more instructions that, when executed by one or more processors, cause the one or more processors to obtain information included in a corpus of documents relating to an organization. The one or more instructions may cause the one or more processors to identify a set of values indicating personal information for one or more individuals by using a set of natural language processing techniques to analyze the information included in the corpus of documents. The set of natural language processing techniques may include at least one of: a first one or more natural language processing techniques associated with analyzing one or more unstructured documents of the corpus of documents, or a second one or more natural language processing techniques associated with analyzing one or more structured documents of the corpus of documents.

Additionally, the one or more instructions may cause the one or more processors to determine a set of relationships between one or more values, of the set of values indicating the personal information, by analyzing the information included in the corpus of documents and the set of values indicating the personal information using at least one of: one or more additional natural language processing techniques or one or more rules. The one or more instructions may cause the one or more processors to generate a set of user profiles for the one or more individuals based on the set of relationships between the one or more values indicating the personal information. Each user profile, of the set of user profiles, may associate one or more documents, of the corpus of documents, with identified personal information relating to a particular individual of the one or more individuals. The one or more instructions may cause the one or more processors to perform one or more actions associated with using the set of user profiles to service a request for information.

BRIEF DESCRIPTION OF THE DRAWINGS

FIGS. 1A-1D are diagrams of an overview of an example implementation described herein;

DETAILED DESCRIPTION

Figure 1A:
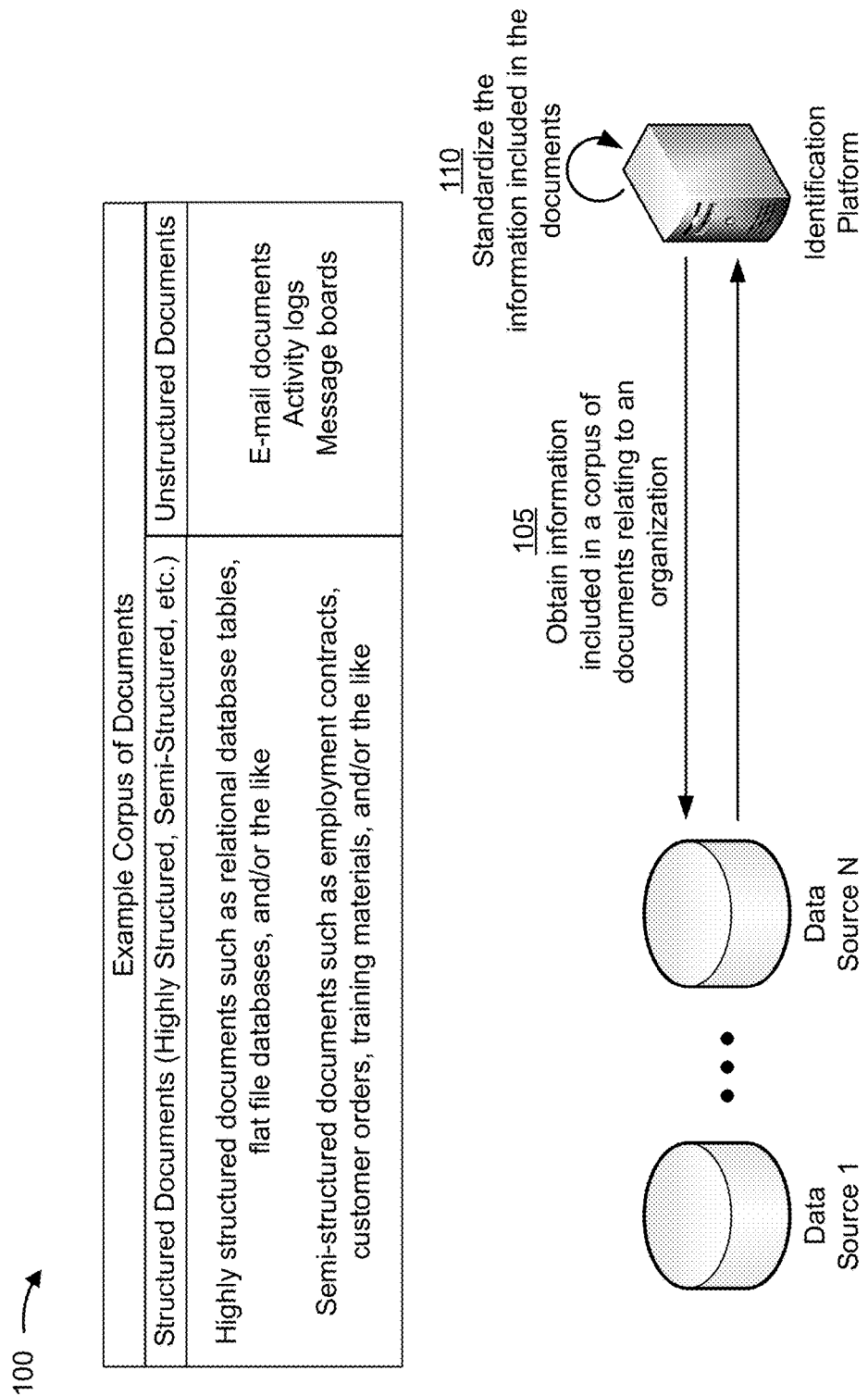

The following detailed description of example implementations refers to the accompanying drawings. The same reference numbers in different drawings may identify the same or similar elements.

New data privacy laws may impose duties on organizations with respect to managing personal information. For example, a regulation (e.g., the General Data Protection Regulation (GDPR)) may require that an organization track which electronic documents include personal information relating to customers and/or employees. Additionally, the regulation may require that the organization adhere to requests for the personal information. For example, an individual (e.g., a customer, an employee, an ex-employee, etc.) may submit a request to remove all (or some) personal information relating to the individual that is stored by the organization. If the organization falls out of compliance, the organization may incur fines.

However, performing a manual audit to identify personal information in a corpus of documents of the organization may be tedious, expensive, and/or time consuming. Additionally, using a device to automate the auditing may be difficult as the corpus of documents may include different file types, file formats, document structures, field types within documents, and/or the like. Furthermore, even if the device is able to identify the personal information in the corpus of documents, the device might not be able to sort the personal information based on a particular individual to which the personal information belongs, might not be able to link personal information for a particular individual across multiple documents in the corpus, might not be able to provide a secure way to service the requests for information, and/or the like.

Some implementations described herein provide an identification platform to generate user profiles that associate personal information of individuals with particular documents in a corpus of documents that reference the personal information, thereby allowing the user profiles to be used (e.g., queried) to service requests for information. For example, the identification platform may obtain information included in a corpus of documents relating to the organization. In this case, the identification platform may standardize the information into a uniform format, and may use one or more natural language processing (NLP) techniques to analyze the information to identify a set of values indicating personal information for one or more individuals. The set of values may include a name value, an address value, a date of birth value, an e-mail address value, a phone number value, an IP address value, one or more bank information values, an online alias value (e.g., a username to a particular webpage), and/or the like.

Additionally, the identification platform may use one or more additional NLP techniques and/or one or more rules (e.g., a domain-specific rule, a document-specific rule, a natural language processing rule, etc.) to analyze the information included in the corpus of documents and the set of values indicating the personal information to determine a set of relationships between values. Furthermore, the identification platform may generate a set of user profiles for the one or more individuals, and may store the set of user profiles in an anonymized format. In this way, the identification platform is able to securely store the set of user profiles in a way that allows the identification platform to service a request for information while keeping the information anonymized.

By automatically generating the set of user profiles that associates personal information of individuals with documents in the corpus that include the personal information of the individuals, the identification platform allows the organization to maintain compliance with data privacy laws. Furthermore, generation of the user profiles by the identification platform conserves processing resources relative to an inferior platform that has to perform a full audit each time a request is received (e.g., because the inferior platform may analyze the entire corpus of documents each time a request is received). Moreover, the identification platform improves data security by storing the user profiles in an anonymized format.

FIGS. 1A-1D are diagrams of an overview of an example implementation 100 described herein. As shown in FIGS. 1A-1D, example implementation 100 shows an identification platform that is able to automatically identify personal information included in a corpus of documents relating to an organization, and is able to generate a set of user profiles, such that each user profile is linked to all (or some) documents in the corpus that include personal information for a particular individual.

As shown in FIG. 1A, and by reference number 105, the identification platform may obtain, from one or more data sources (shown as Data Source 1 through Data Source N), information included in the corpus of documents relating to the organization. For example, the identification platform may search (e.g., query) the one or more data sources to obtain a set of structured documents and a set of unstructured documents. In some cases, the structured documents may highly structured and/or semi-structured documents. If a document is a highly structured document, the documents metadata may be known in advance (e.g., a type of data may relate to a particular table or column or row in a file). If a document is a semi-structured document, the data may be logically organized in a certain way but the metadata of the document may not be explicitly labeled.

The corpus of documents may include documents that include customer information, employee information, business information, and/or the like. The customer information may be included in customer order forms, customer service tickets, and/or the like. The employee information may be included in employment forms, training materials, employee work product, and/or the like. The business information may be included in research and development (R&D) materials, planning and forecasting materials, accounting and finance materials, human resources materials, and/or the like.

As shown by reference number 110, the identification platform may standardize the information included in the corpus of documents into a uniform format. For example, the identification platform may obtain documents in different file types and/or file formats, such as e-mail documents, word processing documents, presentation documents, spreadsheet documents, web documents (e.g., forums, Wiki's, blogs, etc.), and/or the like. In this case, the identification platform may standardize the documents and/or information included in the documents into a uniform file type, file format, and/or data type, such that the standardized file type, file format, and/or data type may be further processed, as described further herein.

In this way, the identification platform is able to obtain and standardize information included in a corpus of documents for further processing.

Figure 1B:
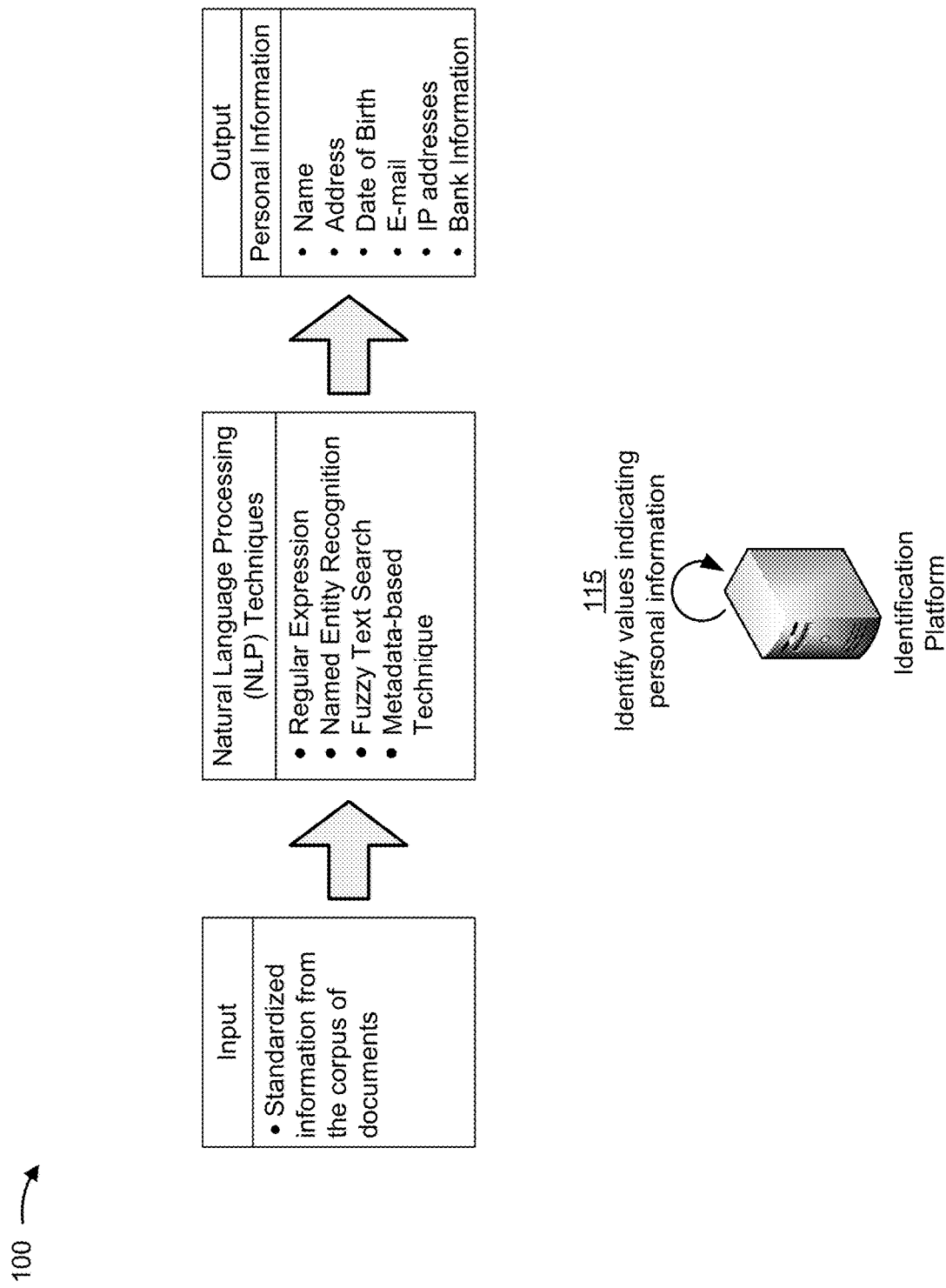

As shown in FIG. 1B, and by reference number 115, the identification platform may identify, in each document, of the corpus of documents, a set of values indicating personal information for particular individuals. For example, the identification platform may use a set of natural language processing (NLP) techniques to analyze the information included in the corpus of documents.

In this case, the identification platform may identify personal information using a token-based NLP technique (e.g., a technique using regular expressions), a category-based NLP technique (e.g., a named entity recognition (NER) technique), an approximation-based NLP technique (e.g., a fuzzy text search technique), a metadata-based NLP technique, and/or the like. The set of values may include a name value, an address value, a date of birth value, an e-mail address value, a phone number value, a personal identification value, a driver's license value, an IP address value, a bank information value, an online alias value (e.g., a username to a particular website), and/or the like.

As an example, the identification platform may execute a NLP technique using regular expressions to identify one or more values indicating personal information. For example, the identification platform may reference a data structure that may be used to identify personal information, and may compare the regular expressions to the information included in the corpus of documents to identify the values indicating personal information. A regular expression, as applied to a document that includes personal information, may be used to find an e-mail address (e.g., by searching for text near an @ symbol), an IP address (e.g., by searching for a series of numbers and periods that match common IP address strings), a street address (e.g., by searching for a state or a zip code string), a credit card number, a passport number, a bank code, and/or the like. A detailed description of each natural language processing technique is described further herein.

In this way, the identification platform is able to utilize a set of NLP techniques to identify values indicating personal information of individuals referenced in the corpus of documents.

As shown in FIG. 1C, and by reference number 120, the identification platform may determine a set of relationships between one or more values of the set of values indicating the personal information. For example, the identification platform may use one or more additional NLP techniques and/or one or more rules to determine the set of relationships between one or more values indicating the personal information. A value indicating a first type of personal information (e.g., a name) may be related to one or more other values indicating other types of personal information (e.g., an address, an e-mail, etc.) if the value and the one or more other values are personal information for the same individual.

The one or more additional NLP techniques may include a text proximity technique, a co-reference resolution technique, a proximity evaluation technique, and/or the like. The one or more rules may include a domain-specific rule, an organization-specific rule, a document-specific rule, and/or the like.

As an example, assume the identification platform is configured with a text proximity technique. In this case, the identification platform may apply the text proximity technique to a document, of the corpus of documents, to determine one or more relationships between values associated with personal information of a particular individual. The distance rule may identify that a first value and a second value are related if the first value and the second value are within a threshold distance of each other (e.g., a threshold number of characters, a threshold number of words, a threshold number of fields, etc.).

As a specific example, an employment form may include a first field where an employee has input a name (e.g., shown as John Doe). In this example, the employment form may include a second field for an employee address (e.g., shown as 1421 Tree Dr., Sierra Va.). Here, the identification platform may use the text proximity technique to determine that the value John Doe is related to the value 1421 Tree Dr., Sierra Virginia because the value John Doe and the value 1421 Tree Dr., Sierra Va. are within the threshold distance of each other (e.g., one is the first field of a document, one is the second field of the document). Further description of each additional NLP technique and/or rule may be found further herein.

As shown by reference number 125, the identification platform may generate a set of user profiles. For example, the identification platform may generate one or more user profiles for each individual of the one or more individuals. A user profile may include a set of related values, such as a name value, an address value, a date of birth value, an e-mail address value, an IP address value, a bank information value, and/or the like.

Additionally, the identification platform may establish, for each user profile, an association between the user profile and one or more documents of the corpus. For example, the identification platform may store, for a value in a user profile, one or more links (e.g., hyperlinks), document identifiers (IDs), and/or the like, that associate the value with all (or some) documents in the corpus that include the value. In this way, the identification platform is able to create an index that identifies each document in the corpus that includes personal information associated with a particular individual.

As shown as an example, the identification platform may identify a value John Doe, and may generate a user profile that includes the value John Doe and any other values that are related to the value John Doe, such as an address value 1421 Tree Dr., Sierra Va., a date of birth value 7-3-1986, an e-mail value jdoe@email.com, and an internet protocol (IP) address value 1.2.3.4. Additionally, the identification platform may store, as part of the user profile, associations with documents in the corpus that reference each value (e.g., the name John Doe is found in a document with document ID 123, a document with document ID 124, and a document with document ID 141).

In this way, the identification platform is able to generate user profiles that may be used to service requests for information, as described below.

Figure 1D:
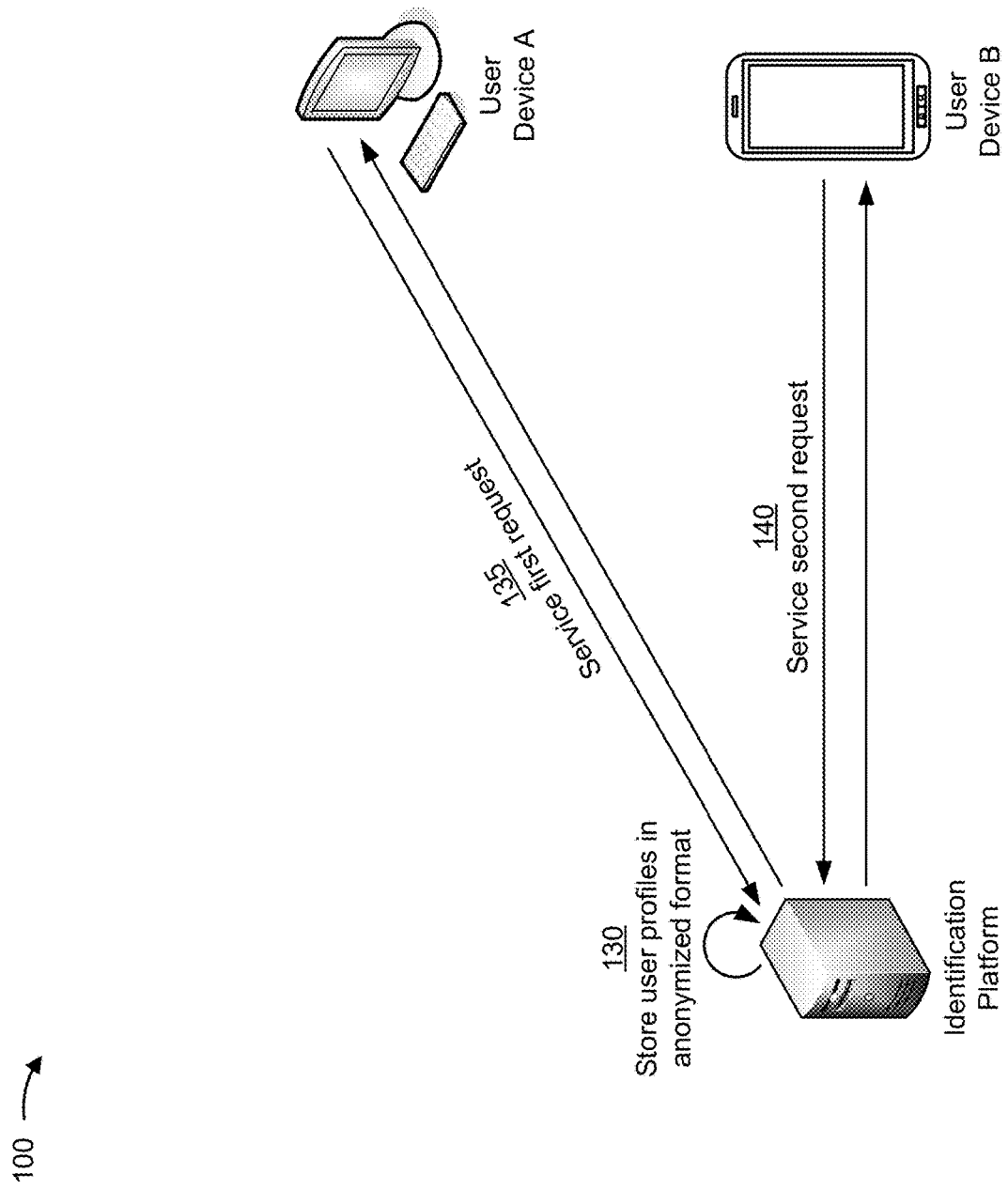

As shown in FIG. 1D, and by reference number 130, the identification platform may store the set of user profiles in an anonymized format. For example, the identification platform may execute an encryption technique to generate an index of cryptographic personal information for the set of user profiles.

As an example, the identification platform may use a cryptographic hash function to create an index of hashed personal information. For example, the identification platform may execute a hash function on each value included in a user profile, and the hash function may output a cryptographic hash value for each value included in the user profile. In some cases, the identification platform may hash, with the values in the user profile, a user profile identifier and/or one or more document identifiers for documents in which the personal information may be found.

As shown by reference number 135, the identification platform may service a first request. For example, the identification platform may receive, from a user device (shown as User Device A), a first request to remove personal information of a particular individual. In this case, the identification platform may execute the encryption technique to generate one or more cryptographic values associated with information included in the first request, and may compare each cryptographic value to values in the index of cryptographic personal information for the set of user profiles (e.g., stored in a data structure).

Next, the identification platform may determine one or more matching values, and may identify a user profile associated with the one or more matching values that may be referenced to identify documents that need to be deleted or redacted. Additionally, the identification platform may remove (e.g., delete, redact, etc.) the personal information from the one or more documents, and may provide, to the user device, an indication that the personal information associated with the particular individual has been removed from the corpus of documents.

As shown by reference number 140, the identification platform may service a second request. For example, the identification platform may receive, from another user device (shown as User Device B), a second request for a list of documents that include a threshold amount of personal information. In this case, the identification platform may identify the list of documents by comparing an amount of personal information included in each document to the threshold amount of personal information. Additionally, the identification platform may provide the list of documents for display on a user interface of the other user device, where the list of documents may be accessed by a user to perform a risk management assessment.

In this way, the identification platform is able to comply with data privacy laws. Furthermore, by generating the set of user profiles, the identification platform reduces a utilization of processing resources while servicing requests (e.g., relative to performing a full audit each time a request is received).

As indicated above, FIGS. 1A-1D are provided merely as an example. Other examples are possible and may differ from what was described with regard to FIGS. 1A-1D. For example, there can be additional devices and/or networks, fewer devices and/or networks, different devices and/or networks, or differently arranged devices and/or networks than those shown in FIGS. 1A-1D. Furthermore, two or more devices shown in FIGS. 1A-1D can be implemented within a single device, or a single device shown in FIGS. 1A-1D can be implemented as multiple, distributed devices. Additionally, or alternatively, a set of devices (e.g., one or more devices) of example implementation 100 can perform one or more functions described as being performed by another set of devices of example implementation 100.

Figure 2:
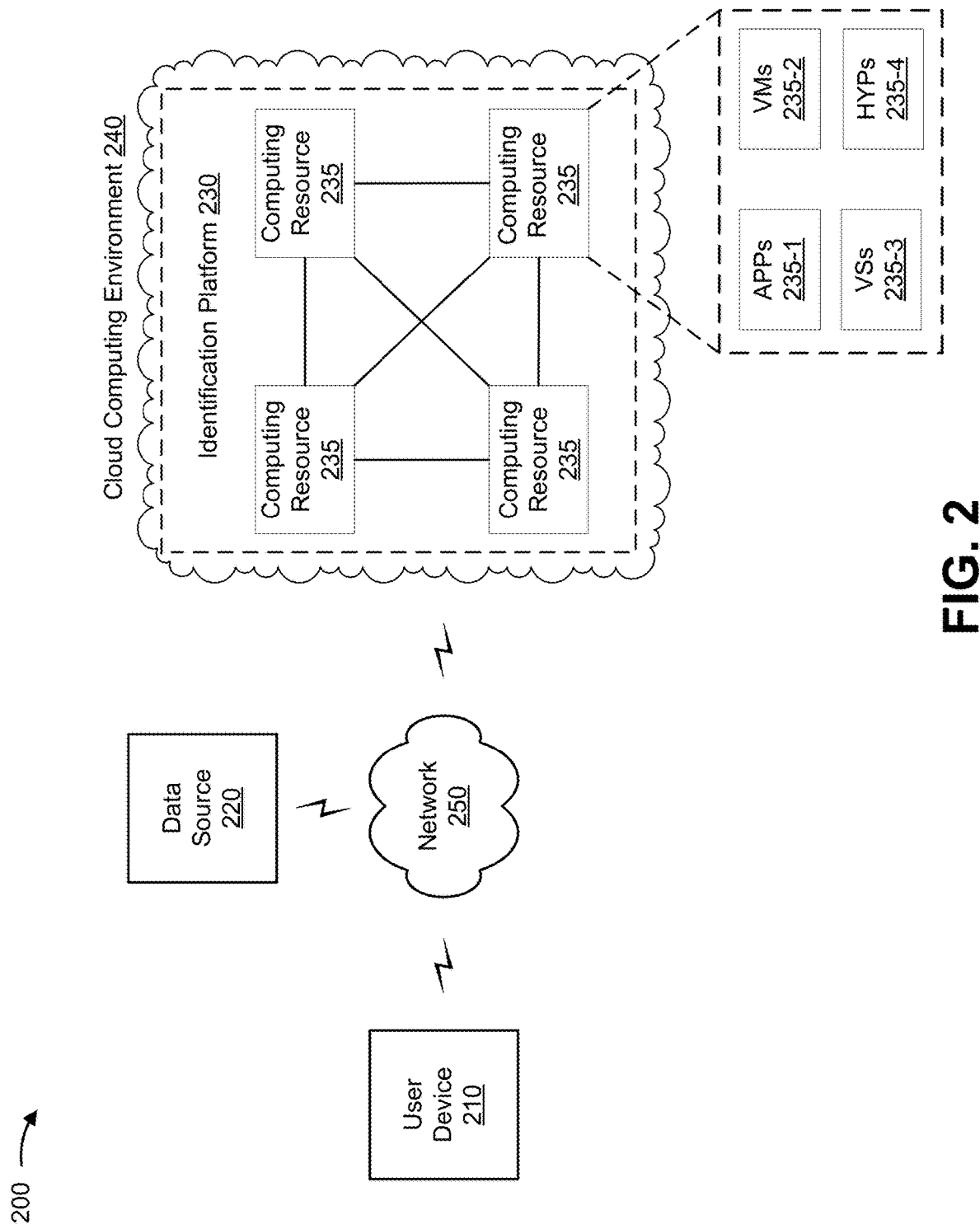
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data source 220, an identification platform 230 hosted by a cloud computing environment 240, and/or a network 250. Devices of environment 200 may interconnect via wired connections, wireless connections, or a combination of wired and wireless connections.

User device 210 includes one or more devices capable of receiving, generating, storing, processing, and/or providing information associated with an organization. For example, user device 210 may include a communication and/or computing device, such as a phone (e.g., a mobile phone, such as a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide, to identification platform 230, a request for information associated with an organization. In some implementations, user device 210 may receive, from identification platform 230, information identifying one or more documents that include personal information relating to a particular individual, an indication that personal information relating to an individual has been removed from a corpus of documents, information associated with a risk assessment, and/or the like.

Data source 220 includes one or more devices capable of receiving, generating, storing, processing, and/or providing information associated with an organization. For example, data source 220 may include a server device or a similar type of device. In some implementations, data source 220 may receive, from identification platform 230, a request for information associated with an organization, which may cause data source 220 to provide the information associated with the organization to identification platform 230.

Identification platform 230 includes one or more devices associated with receiving, generating, storing, processing, and/or providing information associated with an organization. For example, identification platform 230 may include a server device (e.g., in a data center or a cloud computing environment), a data center, a workstation computer, a virtual machine (VM) provided in a cloud computing environment, or a similar type of device.

In some implementations, as shown, identification platform 230 may be hosted in cloud computing environment 240. Notably, while implementations described herein describe identification platform 230 as being hosted in cloud computing environment 240, in some implementations, identification platform 230 might not be cloud-based (i.e., may be implemented outside of a cloud computing environment) or may be partially cloud-based.

Cloud computing environment 240 includes an environment that hosts identification platform 230. Cloud computing environment 240 may provide computation, software, data access, storage, and/or other services that do not require end-user knowledge of a physical location and configuration of system(s) and/or device(s) that host identification platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host identification platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 includes one or more software applications that may be provided to or accessed by user device 210 or a similar type of device. Application 235-1 may eliminate a need to install and execute the software applications on user device 210 or a similar type of device. For example, application 235-1 may include software associated with identification platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating system to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a fourth generation (4G) network, such as a long term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
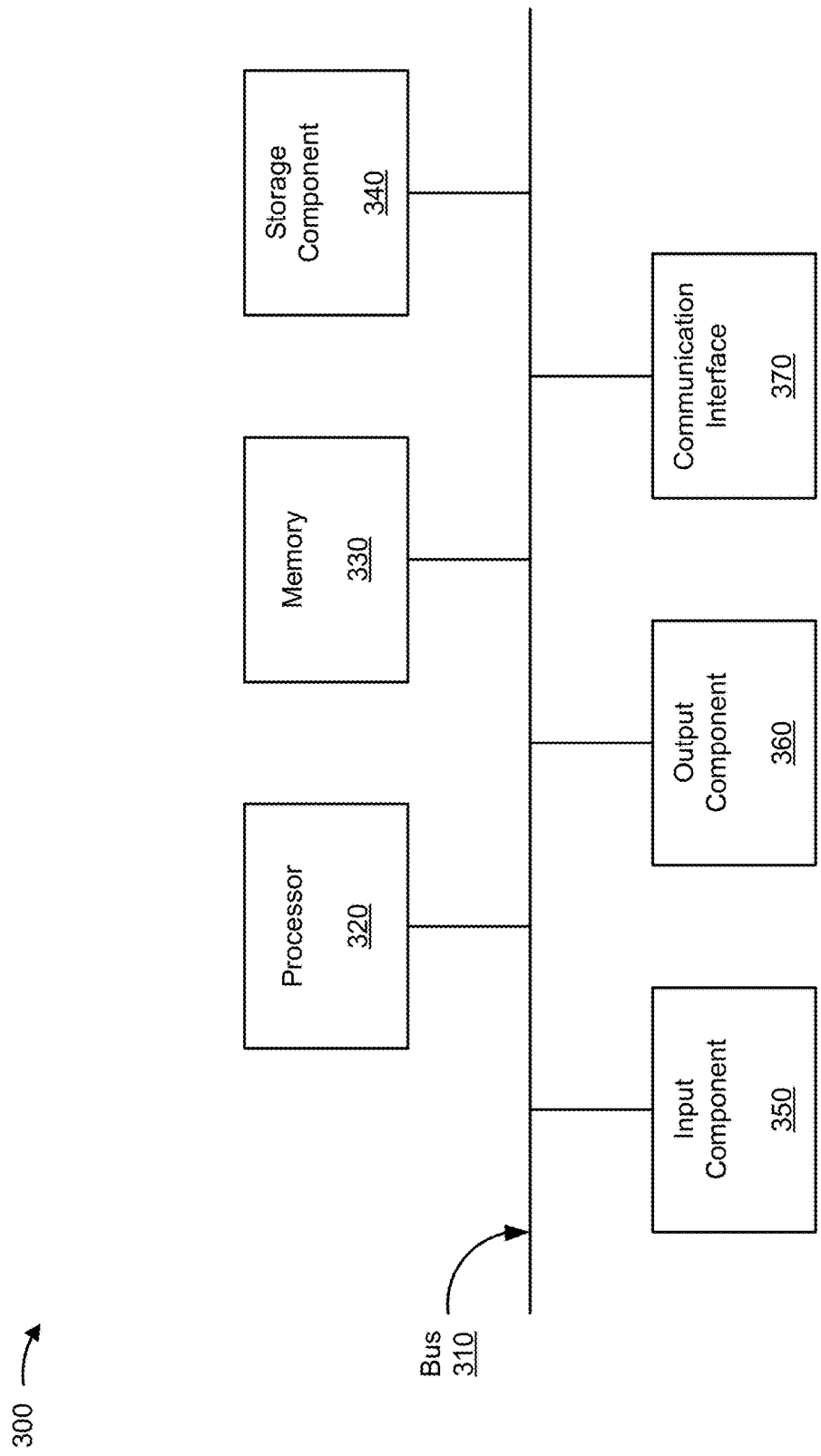
FIG. 3 is a diagram of example components of one or more devices of FIG. 2.

FIG. 3 is a diagram of example components of a device 300. Device 300 may correspond to user device 210, data source 220, and/or identification platform 230. In some implementations, user device 210, data source 220, and/or identification platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
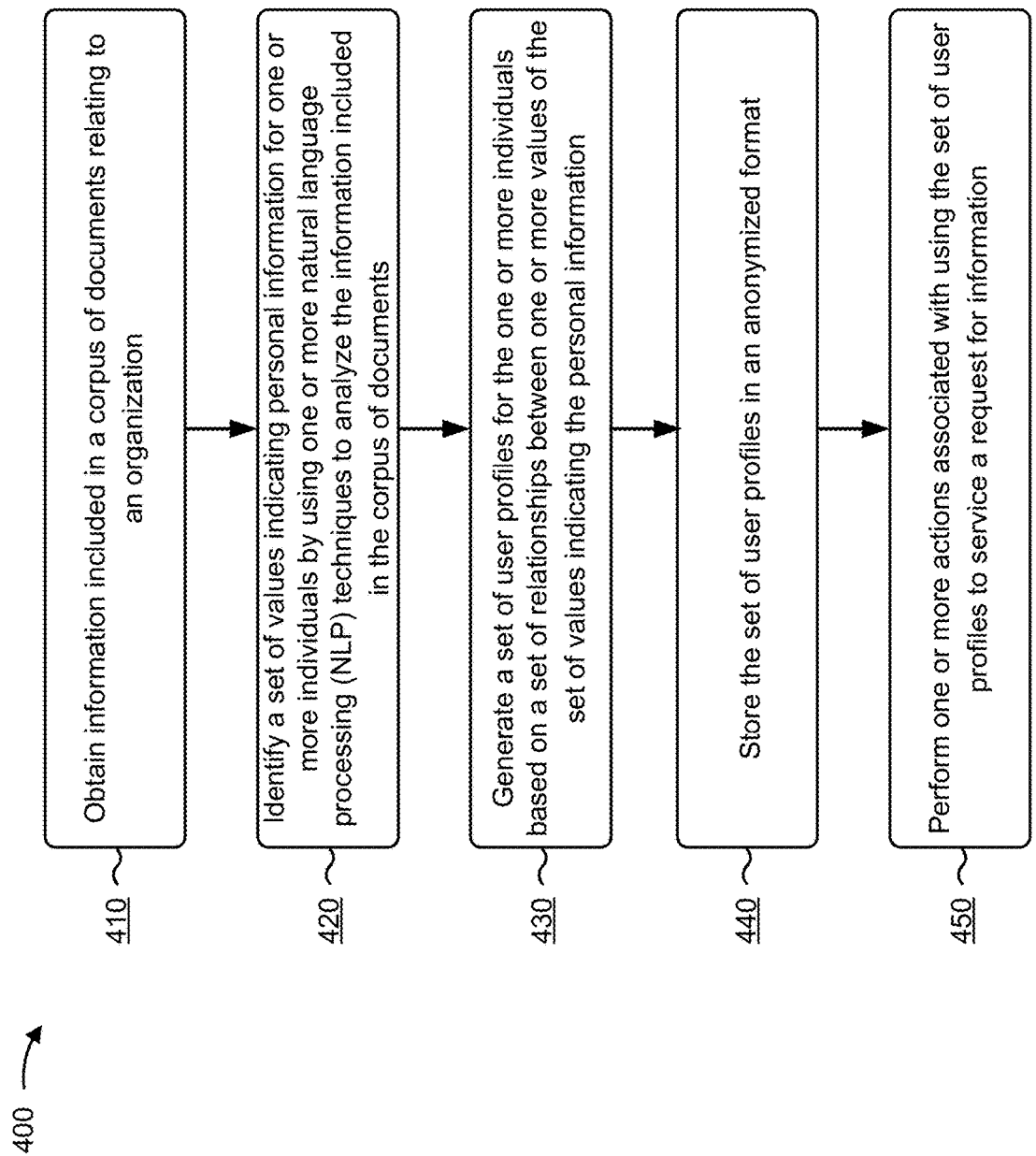
FIG. 4 is a flow chart of an example process for identifying personal information included in a corpus of documents, generating user profiles to relate the personal information to particular individuals, and securely storing the user profiles to allow the user profiles to be used to service requests for information.

FIG. 4 is a flow chart of an example process 400 for identifying personal information included in a corpus of documents, generating user profiles to relate the personal information to particular individuals, and securely storing the user profiles to allow the user profiles to be used to service requests for information. In some implementations, one or more process blocks of FIG. 4 may be performed by identification platform 230. In some implementations, one or more process blocks of FIG. 4 may be performed by another device or a group of devices separate from or including identification platform 230, such as user device 210 and/or data source 220.

As shown in FIG. 4, process 400 may include obtaining information included in a corpus of documents relating to an organization (block 410). For example, identification platform 230 (e.g., computing resource 235, processor 320, memory 330, storage component 340, and/or the like) may obtain, by searching (e.g., querying) data source 220, a set of structured documents and a set of unstructured documents that include information relating to an organization.

In some implementations, data source 220 may store documents that include customer information, employee information, business information, and/or the like. For example, data source 220 may store a number of different types of documents that have different file types, different file formats, data of different data types, and/or the like. In this case, the documents may include e-mail files, word processing files, presentation files, spreadsheet files, webpage files or links to webpages (e.g., forums, Wiki pages, etc.), and/or the like. As an example of specific files relating to an organization, data source 220 may store customer orders, customer service tickets, hiring documents, billing documents, work product created by a particular employee, account and financial documents, billing documents, and/or the like.

In some implementations, identification platform 230 may obtain the information included in the corpus of documents. For example, identification platform 230 may search (e.g., query) data source 220 to obtain the information, may be configured to receive the information (e.g., automatically, periodically over an interval, etc.), and/or the like.

In some implementations, identification platform 230 may standardize the information included in the corpus of documents. For example, identification platform 230 may obtain information associated with different data types, data formats, and/or the like, and may standardize the information to a uniform data type, data format, and/or the like. In some implementations, identification platform 230 may apply different standardization techniques for different data types or data formats. As an example, identification platform 230 may standardize the information to a text format, such that the identification platform 230 is able to apply further analysis to the text, as described further herein. By using an appropriate standardization technique for a particular data type or data format, identification platform 230 conserves processing resources relative to using an inappropriate standardization technique.

In this way, identification platform 230 is able to obtain the information included in the corpus of documents relating to the organization.

As further shown in FIG. 4, process 400 may include identifying a set of values indicating personal information for one or more individuals by using a set of natural language processing (NLP) techniques to analyze the information included in the corpus of documents (block 420). For example, identification platform 230 (e.g., computing resource 235, processor 320, memory 330, storage component 340, and/or the like) may identify a set of values indicating personal information for one or more individuals (e.g., customers, employees, etc.) by using a set of natural language processing techniques to analyze the information included in the corpus of documents. The set of values may include a name value, an address value, a date of birth value, an e-mail address value, a phone number value, an IP address value, a bank information value, an online alias value (e.g., a username to a particular webpage), and/or the like.

In some implementations, identification platform 230 may execute a first one or more NLP techniques for analyzing unstructured documents. For example, identification platform 230 may analyze unstructured documents using a token-based NLP technique (e.g., a technique using regular expressions), a category-based NLP technique (e.g., a named entity recognition (NER) technique), an approximation-based NLP technique (e.g., a fuzzy text search technique), and/or the like. Additionally, or alternatively, identification platform 230 may analyze structured documents using a second one or more NLP techniques (e.g., a metadata-based NLP technique and/or a similar type of technique).

In some implementations, identification platform 230 may execute a token-based NLP technique, such as a technique using regular expressions, to identify personal information. For example, identification platform 230 may reference a data structure that stores regular expressions that may be used to identify personal information, and use the regular expressions to identify the personal information included within the corpus of documents. A regular expression, as applied to a document that includes personal information, may be used to find an e-mail address (e.g., by searching for text near an @ symbol), an IP address (e.g., by searching for a series of numbers and periods that match common IP address strings), a street address (e.g., by searching for a state or a zip code string), a credit card number, a passport number, a bank code, and/or the like. In this way, identification platform 230 is able to use a token-based NLP technique to identify personal information.

Additionally, or alternatively, identification platform 230 may execute a category-based NLP technique, such as a NER technique, to identify personal information. For example, identification platform 230 may identify and classify types of personal information into predefined categories, such as names of persons, organizations, locations, expressions of time, quantities, percentages, and/or the like. In this case, identification platform 230 may use the NER technique to analyze the information included in the corpus of documents to identify types of personal information.

In some cases, identification platform 230 may use a machine learning model to identify personal information. For example, identification platform 230 may train a machine learning model that scores historical information relating to the organization (or to a similar type of organization). Here, identification platform 230 may provide the information included in the corpus of documents as input to the machine learning model, which may cause the machine learning model to output personal information. As an example, a NER technique or a machine learning model may process "Steve bought 300 shares of Test Corp. in 2008." In this case, the NER technique or the machine learning model may output "Steve[person] bought 300 shares of Test Corp. [organization] in 2008[time]."

Additionally, or alternatively, identification platform 230 may execute an approximation-based NLP technique, such as a fuzzy text search technique, to identify personal information. For example, identification platform 230 may execute an approximation-based NLP technique to identify personal information that satisfies a threshold level of similarity with personal information stored using a data structure. In this case, identification platform 230 may set a threshold level of similarity (e.g., a percentage, a number of characters, etc.), and may compare information included in a document to personal information stored using the data structure. If the data included in the document satisfies the threshold level of similarity with the personal information stored using the data structure, identification platform 230 may identify the data as personal information. A fuzzy text search may be used in situations where personal information is limited to a fixed number of choices (e.g., gender, nationality, etc.).

Additionally, or alternatively, identification platform 230 may execute a metadata-based NLP technique to identify personal information in structured documents. For example, identification platform 230 may analyze the one or more structured documents to identify document-specific metadata, and may use the document-specific metadata to identify personal information. Document-specific metadata may include information associated with a document layout, information associated with positioning of terms or values within a document, information associated with format indicators (e.g., a colon, a semi-colon, a dash, a comma, a tab, a white space, etc.), and/or the like. In some cases, identification platform 230 may identify a particular format indicator as document-specific metadata, and may use the particular format indicator to separate terms and values within the document.

In some implementations, identification platform 230 may use multiple NLP techniques, and may filter outputs of the multiple NLP techniques into the set of values indicating the personal information. For example, identification platform 230 may identify a first set of values using a first one or more natural language processing techniques. Additionally, identification platform 230 may identify a second set of values using a second one or more natural language processing techniques. There may, in some cases, be a mixture of overlapping values and conflicting values. In this case, identification platform 230 may address the conflicting values by filtering the first set of values and the second set of values into a third set of values that excludes duplicate values, excludes conflicting values (e.g., by selecting one value, of two conflicting values, using a rule, such a threshold) and/or the like. Furthermore, identification platform 230 may use the third set of values as the set of values indicating the personal information.

In some implementations, identification platform 230 may execute one or more of the above-mentioned natural language processing techniques on a particular type of document, on a particular document, on a particular field or group of fields within a document, and/or the like. Additionally, or alternatively, identification platform 230 may take an average, or a weighted average, of the outputs of the one or more NLP techniques being deployed to identify the personal information. As an example, the identification platform 230 may assign a weight to an output associated with each additional NLP technique, rule, and/or knowledge graph node, and may take an average or a weighted average to identify the personal information. In some cases, weights may be selected based on a type of document and/or based on a domain of a document.

In this way, identification platform 230 is able to identify personal information for the one or more individuals referenced in the corpus of documents.

As shown in FIG. 4, process 400 may include generating a set of user profiles for the one or more individuals based on relationships between one or more values of the set of values indicating the personal information (block 430). For example, identification platform 230 (e.g., computing resource 235, processor 320, memory 330, storage component 340, and/or the like) may use one or more additional NLP techniques, one or more rules, a knowledge graph, and/or one or more machine learning algorithms to identify a set of relationships between one or more values indicating the personal information, and may, based on the set of relationships, generate a set of user profiles for the one or more individuals. The one or more machine learning algorithms may be used to automatically learn relationships from labeled training data. A value indicating a first type of personal information (e.g., a name) may be related to one or more other values indicating other types of personal information (e.g., an address, an e-mail, etc.) if the value and the one or more other values are personal information for the same individual.

In some implementations, the one or more additional NLP techniques may include a text proximity technique, a co-reference resolution technique, a proximity evaluation technique, and/or the like. Additionally, or alternatively, the one or more rules may include a domain-specific rule, an organization-specific rule, a document-specific rule, and/or the like. In some cases, identification platform 230 may automatically determine the set of relationships by applying at least one of the one or more additional natural language processing techniques, the one or more rules, or a knowledge graph to labeled training data.

In some implementations, identification platform 230 may be configured to use an additional natural language processing technique and/or a distance rule to analyze the information included in the corpus of documents and/or the set of values indicating the personal information based on proximity of the identified set of values in a document. For example, identification platform 230 may use a text proximity technique and a distance threshold to identify relationships between values based on the values proximity to each other. In this case, identification platform 230 may analyze a document in the corpus using the text proximity technique and the distance threshold to identify whether the values are related. Additionally, identification platform 230 may use the text proximity technique and/or the distance rule to identify values based on character distance, word distance, sentence distance, field distance, and/or the like.

Additionally, or alternatively, identification platform 230 may be configured to use an additional natural language processing technique and/or rule to analyze information included in the corpus of documents and/or the set of values indicating the personal information based on semantic context of the identified set of values in a document. For example, identification platform 230 may execute a co-reference resolution technique to identify relationships between values indicating the personal information, such as by identifying multiple types of personal information that relate to the same individual. As an example, assume a document states "Bill's address is 123 Cherry Lane. His phone number is 123-4567." In this case, identification platform 230 may utilize co-reference information to identify that "his" refers to Bill, and thus, the personal information name "Bill" is related to the personal information phone number "123-4567."

Additionally, or alternatively, identification platform 230 may execute a proximity evaluation technique and/or a proximity rule to identify relationships between values indicating the personal information. For example, identification platform 230 may execute a proximity evaluation technique and/or a proximity rule to identify values as related even if the values are not located in a threshold distance of each other within a document (and thus the relations would be undetectable by the text proximity technique).

As an example, identification platform 230 may use a proximity rule indicating that regardless of a distance between two values, if there are no intermediate values found between the two values, then the values may be determined to be related. In this case, identification platform 230 may execute the proximity evaluation technique, with the proximity rule, to determine that a first value and a second value are related, despite the first value appearing at the top of a document and the second value appearing at the bottom of the document.

Additionally, or alternatively, identification platform 230 may use a document-specific rule to identify relationships between values indicating the personal information. For example, identification platform 230 may be configured with a document-specific rule that relies on document metadata, expert knowledge relating to a particular type of document, and/or the like, and may use the document-specific rule to identify relationships between the personal information.

As an example, a document-specific rule for an e-mail document might indicate that values included in a signature at the end of the e-mail are related personal information. Similarly, a document-specific rule for an employment form might indicate that values included in a particular group of fields are related personal information (e.g., the first group of fields in an employment form may indicate an employee name, an address, contact information, etc.).

Additionally, a document-specific rule might be used to provide context of a relationship between a first value and a second value. As an example, assume an ontology identifies Company A as an organization that, when compared to a particular individual, may be an employer (e.g., to an employee) or a service provider (e.g., to a customer). In this case, assume a document identifies Company A throughout the document, but does not explicitly identify an individual referenced in the document as an employee or a customer of Company A. In this case, if the document type is a customer order, identification platform 230 may relate the individual as a customer of Company A. Alternatively, if the document type is an employment form, identification platform 230 may relate the individual as an employee of Company A.

Additionally, or alternatively, identification platform 230 may infer relationships using a data structure-driven NLP technique and/or a data structure-driven rule. For example, identification platform 230 may reference an ontology of words and phrases to infer relationships.

As an example, a data structure, such as a knowledge graph, may store synonyms of personal information, and identification platform 230 may reference the data structure to identify synonyms as referring to the same type of personal information, despite the terms having different characters. As a specific example, identification platform 230 may execute a data structure-driven NLP technique on the phrase "John Doe is American," which may be located in a first document, and may execute the data structure-driven NLP technique on the phrase "John Doe is a citizen of the United States," which may be located in a second document. In this example, identification platform 230 may reference the data structure to determine that both phrases identify citizenship information for John Doe (e.g., namely, that John Doe is a citizen of the United States). In other examples, the knowledge graph may store other types of relationships, such as antonyms, homonyms, and/or the like.

In some implementations, identification platform 230 may determine relationships using one or more of the above-mentioned additional NLP techniques and/or rules. For example, identification platform 230 may use multiple additional NLP techniques and/or rules (e.g., two or more additional NLP techniques, two or more rules, etc.) to identify relationships, where some of the identified relationships match across additional NLP techniques and/or rules and some of the identified relationships do not match. In this case, identification platform 230 may mark the matching relationships as relationships, and may apply a rule to identify relationships in situations with a mismatch.

As an example, assume a group of additional NLP techniques identify a relationship between a first value and a second value, and that another additional NLP technique does not identify the relationship between the first value and the second value (despite processing both values when the other additional NLP technique was executed). In this case, identification platform 230 may determine whether a relationship between the first value and the second value exists by applying a rule to resolve the mismatch. The rule may be to use a particular threshold, average, weighted average, and/or the like.

In some implementations, identification platform 230 may generate the set of user profiles. For example, identification platform 230 may generate a user profile based on the identified relationships between values indicating the personal information. A user profile may include a set of related values, such as a name value, an address value, a date of birth value, an e-mail address value, an IP address value, a bank information value, and/or the like.

In some implementations, identification platform 230 may establish, for a user profile, an association between the user profile and one or more documents of the corpus of documents. For example, identification platform 230 may store, for each value in a user profile, one or more links (e.g., hyperlinks), document identifiers, and/or the like, that associate each value with all (or some) documents in the corpus that include that value. By storing each user profile in a way that relates the user profile back to documents that include the personal information, identification platform 230 is able to create an index that identifies each document in the corpus that includes personal information associated with a particular individual.

In this way, identification platform 230 is able to generate the set of user profiles.

As shown in FIG. 4, process 400 may include storing the set of user profiles in an anonymized format (block 440). For example, identification platform 230 (e.g., computing resource 235, processor 320, memory 330, storage component 340, and/or the like) may standardize personal information in each user profile, of the set of profiles, and may use an encryption technique (e.g., a hash function) to generate an index of cryptographic personal information. This allows the personal information to be securely stored in a manner that is able to be queried by user device 210, as described further herein.

In some implementations, identification platform 230 may standardize the personal information. For example, identification platform 230 may standardize each type of personal information by reducing values to a short form, removing particular grammar instances (e.g., capital letters), splitting values based on rules (e.g., separation of a country code from a remainder of a phone number, etc.), and/or the like. In this case, identification platform 230 may standardize the personal information into a uniform format that may be encrypted (e.g., hashed).

In some implementations, identification platform 230 may generate an index of cryptographic personal information. For example, identification platform 230 may execute an encryption technique (e.g., a cryptographic hash function) to encrypt (e.g., hash) the personal information. In this case, the encryption technique may output a cryptographic value for each value included in the personal information of a profile. In some cases, identification platform 230 may, with each cryptographic value, encrypt a user profile ID and/or document ID for documents in which the personal information may be found.

In some implementations, identification platform 230 may hash all (or some) variations of each value included in the personal information, such that the index of cryptographic personal information stores a set of variations of each value. As an example, identification platform 230 may encrypt (e.g., hash) a first name, a last name, a first name with a last name, a first name with a middle initial and with a last name, and/or the like. In this way, the index of cryptographic personal information may be able to service requests for information where a user is not constrained by having to input a particular search parameter in order to obtain a desired result, as described further herein.

In some implementations, identification platform 230 may store the index of cryptographic personal information. For example, identification platform 230 may store the index of cryptographic personal information using a data structure, such as a hash table, a linked-list, an array, a tree, a database, and/or the like.

In some implementations, identification platform 230 may modify the index of cryptographic information. For example, identification platform 230 may generate a new user profile to add to the index, may modify the index to update an existing user profile, may remove a user profile from the index based on a request from a user device 210 (as described below), and/or the like.

In this way, identification platform 230 is able to store the set of user profiles in an anonymized format, thereby improving data security by ensuring that the personal information included in the set of user profiles remains anonymous when queried by user device 210.

As shown in FIG. 4, process 400 may include performing one or more actions associated with using the set of user profiles to service a request for information (block 450). For example, identification platform 230 (e.g., computing resource 235, processor 320, memory 330, storage component 340, and/or the like) may use the set of user profiles to service a request to remove personal information of a particular individual from the corpus of documents, a request to obtain information of the particular individual from the corpus of documents, a request to perform a risk assessment on the information included in the corpus of documents, and/or the like.

In some implementations, identification platform 230 may service a request to remove, from the corpus of documents, personal information of a particular individual. For example, identification platform 230 may receive, from user device 210, a request to remove personal information of a particular individual from the corpus of documents. In this case, identification platform 230 may execute an encryption technique to generate one or more cryptographic values for information included in the request.

Additionally, identification platform 230 may compare each cryptographic value to values in an index of cryptographic personal information for the set of user profiles (e.g., stored in a data structure). Furthermore, identification platform 230 may determine that one or more cryptographic values match one or more values included in the index of cryptographic personal information. In this case, identification platform 230 may select a user profile associated with the matching values, and may remove personal information associated with the user profile. For example, identification platform 230 may modify one or more documents of the corpus of documents to remove (e.g., delete, redact, etc.) the personal information that is found in the user profile. Additionally, identification platform 230 may provide, to user device 210, an indication that the personal information associated with the user profile has been removed from the corpus of documents. In some cases, identification platform 230 may provide an indication to user device 210 of personal information that is recommended to be removed, and user device 210 can provide a confirmation that grants identification platform 230 permission to perform the recommendation.

Additionally, or alternatively, identification platform 230 may service a request to identify personal information of a particular individual. For example, identification platform 230 may service a request to identify personal information of a particular individual, in the same manner described above.

In some implementations, identification platform 230 may service a request for a list of documents, of the corpus of documents, that include personal information for one or more individuals relating to the organization. For example, identification platform 230 may receive a request for a list of documents that include a threshold amount of personal information relating to the one or more individuals. In this case, identification platform 230 may reference the index to identify the list of documents that include the personal information, and may analyze the index to determine which user profiles are associated with documents that include the threshold amount of personal information. Here, identification platform 230 may provide the list of documents to user device 210 to allow a user (e.g., a manager) to be able to perform risk management assessments by identifying which documents (as well as a percentage of total documents) have personal information.

In some implementations, identification platform 230 may automatically perform the risk management assessment, and may provide a result of the risk management assessment to user device 210. For example, identification platform 230 may perform a risk management assessment that automatically queries the set of user profiles and/or the index to determine if a particular rule (e.g., a privacy rule indicated by a statute) is capable of being satisfied by the query. In this case, identification platform 230 may perform the risk management assessment on all (or some) possible queries that might be performed to satisfy statutory privacy requirements, and may generate a score indicating a degree to which the organization is being compliant with the statutory privacy requirements. In this way, identification platform 230 provides the organization with an autonomous way to comply (and to maintain compliance) with the statutory privacy requirements.

In this way, identification platform 230 is able to service requests for information that bring the organization into compliance with new privacy regulations.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By automatically generating the set of user profiles that associates personal information of individuals with documents in the corpus that include the personal information of the individuals, identification platform 230 allows the organization to maintain compliance with data privacy laws. Furthermore, generation of the user profiles by identification platform 230 conserves processing resources relative to an inferior platform that has to perform a full audit each time a request is received (e.g., because the inferior platform may analyze the entire corpus of documents each time a request is received). Moreover, identification platform 230 improves data security by storing the user profiles in an anonymized format.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, operatively connected to the one or more memories, to:
obtain information included in a corpus of documents relating to an organization;
identify a set of values indicating personal information for one or more individuals by using a set of natural language processing techniques to analyze the information included in the corpus of documents,
the set of natural language processing techniques including at least one of:
a first one or more natural language processing techniques associated with analyzing one or more unstructured documents of the corpus of documents, or
a second one or more natural language processing techniques associated with analyzing one or more structured documents of the corpus of documents;
determine a set of relationships between one or more values, of the set of values indicating the personal information, by analyzing the information included in the corpus of documents and the set of values indicating the personal information using at least one of:
one or more additional natural language processing techniques,
one or more rules, or
a knowledge graph;
generate a set of user profiles for the one or more individuals based on the set of relationships between the one or more values indicating the personal information;
store the set of user profiles in an anonymized format; and
perform one or more actions associated with using the set of user profiles to service a request for information.

2. The device of claim 1, where the one or more processors are further to:
standardize the information included in the corpus of documents into a uniform format.

3. The device of claim 1, where the one or more processors, when generating the set of user profiles, are to:
establish, for a user profile of the set of user profiles, an association between the user profile and one or more documents, of the corpus of documents, that include personal information relating to a particular individual of the one or more individuals.

4. The device of claim 1, where the first one or more natural language processing techniques include at least one of:
a token-based natural language processing technique,
a category-based natural language processing technique, or
an approximation-based natural language processing technique, and
where the second one or more natural language processing techniques include a metadata-based natural language processing technique.

5. The device of claim 1, where the one or more processors, when determining the set of relationships between the one or more values, are to:
  determine the set of relationships using at least one of:
    the one or more additional natural language processing techniques,
    the one or more rules,
    the knowledge graph, or
    one or more machine learning algorithms to automatically learn relationships from labeled training data.

6. The device of claim 1, where the one or more processors are further to:
  generate an index of cryptographic personal information for the set of user profiles by executing an encryption technique; and
  where the one or more processors, when storing the set of user profiles in the anonymized format, are to:
    store the index of cryptographic personal information.

7. The device of claim 1, where the one or more processors, when performing the one or more actions, are to:
  receive the request for information from a user device,
    the request being a request to remove personal information of a particular individual, of the one or more individuals, from the corpus of documents,
  execute an encryption technique to generate one or more cryptographic values for information included in the request,
  compare each cryptographic value, of the one or more cryptographic values, to values included in an index of cryptographic personal information for the set of user profiles,
  determine that the one or more cryptographic values match one or more values of the values included in the index of cryptographic personal information,
  remove personal information associated with a user profile, of the set of user profiles, based on determining that the one or more cryptographic values match the one or more values included in the index of cryptographic personal information, and
  provide an indication to the user device that the personal information associated with the user profile has been removed from the corpus of documents.

8. A method, comprising:
  obtaining, by a device, information included in a corpus of documents relating to an organization;
  identifying, by the device, a set of values indicating personal information for one or more individuals by using a set of natural language processing techniques to analyze the information included in the corpus of documents,
    the set of natural language processing techniques including at least one of:
      a first one or more natural language processing techniques associated with analyzing one or more unstructured documents of the corpus of documents, or
      a second one or more natural language processing techniques associated with analyzing one or more structured documents of the corpus of documents;
  determining, by the device, a set of relationships between one or more values, of the set of values indicating the personal information, by analyzing the information included in the corpus of documents and the set of values indicating the personal information using at least one of:
    one or more additional natural language processing techniques, or
    one or more rules;
  generating, by the device, a set of user profiles for the one or more individuals based on the set of relationships between the one or more values indicating the personal information; and
  performing, by the device, one or more actions associated with using the set of user profiles to service a request for information.

9. The method of claim 8, where generating the set of user profiles comprises:
  establishing, for a user profile of the set of user profiles, an association between the user profile and one or more documents, of the corpus of documents, that include personal information relating to a particular individual of the one or more individuals.

10. The method of claim 8, where identifying the values indicating the personal information for the one or more individuals comprises:
  identifying, using the first one or more natural language processing techniques, a first set of values indicating personal information for one or more individuals of the one or more individuals,
  identifying, using the second one or more natural language processing techniques, a second set of values indicating personal information for one or more additional individuals of the one or more individuals, or
  filtering the first set of values and the second set of values into a third set of values that excludes duplicates,
    the third set of values being the set of values indicating the personal information.

11. The method of claim 8, wherein the information included in the corpus of documents and the set of values indicating the personal information is analyzed using a weighted combination of:
  the one or more additional natural language processing techniques,
  the one or more rules, and/or
  a knowledge graph.

12. The method of claim 8, wherein an additional natural language processing technique, of the one or more additional natural language processing techniques is configured to analyze the information included in the corpus of documents and the set of values indicating the personal information based on proximity of the identified set of values in a document.

13. The method of claim 8, further comprising:
  generating an index of cryptographic personal information for the set of user profiles by executing an encryption technique; and
  storing the set of user profiles in an anonymized format using the index of cryptographic personal information.

14. The method of claim 8, where performing the one or more actions comprises:
  receiving the request for information from a user device,
    the request being a request for a list of documents, of the corpus of documents, that include a threshold amount of personal information,
  determining whether an amount of personal information included in each document of the corpus of documents satisfies the threshold amount of personal information,
  determining that the amount of personal information included in the list of documents, of the corpus of documents, includes the threshold amount of personal information, and providing the list of documents, for display on a user interface of the user device, to permit the list of documents to be used to perform a risk management assessment.

15. A non-transitory computer-readable medium storing instructions, the instructions comprising:
one or more instructions that, when executed by one or more processors, cause the one or more processors to:
obtain information included in a corpus of documents relating to an organization;
identify a set of values indicating personal information for one or more individuals by using a set of natural language processing techniques to analyze the information included in the corpus of documents,
the set of natural language processing techniques including at least one of:
a first one or more natural language processing techniques associated with analyzing one or more unstructured documents of the corpus of documents, or
a second one or more natural language processing techniques associated with analyzing one or more structured documents of the corpus of documents;
determine a set of relationships between one or more values, of the set of values indicating the personal information, by analyzing the information included in the corpus of documents and the set of values indicating the personal information using at least one of:
one or more additional natural language processing techniques, or
one or more rules;
generate a set of user profiles for the one or more individuals based on the set of relationships between the one or more values indicating the personal information,
where a user profile, of the set of user profiles, associates one or more documents, of the corpus of documents, with identified personal information relating to a particular individual of the one or more individuals; and
perform one or more actions associated with using the set of user profiles to service a request for information.

16. The non-transitory computer-readable medium of claim 15, where the one or more instructions, that cause the one or more processors to identify the set of values indicating the personal information, cause the one or more processors to:
provide the information included in the corpus of documents as input to a machine learning model that has been trained using historical information relating to the organization or to a similar type of organization,
the machine learning model to output the set of values indicating the personal information for the one or more individuals.

17. The non-transitory computer-readable medium of claim 15, wherein an additional natural language processing technique, of the one or more natural language processing techniques, is configured to analyze the information included in the corpus of documents and the set of values indicating the personal information based on semantic context of the identified set of values in a document.

18. The non-transitory computer-readable medium of claim 15, where the one or more instructions, that cause the one or more processors to determine the set of relationships, cause the one or more processors to:
determine the set of relationships using at least one of the one or more additional natural language processing techniques or the one or more rules,
where an output determined by a respective additional natural language processing technique or a respective rule is assigned a weight that is used in determining the set of relationships,
where the weight is selected based on a type of document, of the corpus of documents, and/or based on a domain of a document of the corpus of documents.

19. The non-transitory computer-readable medium of claim 15, where the one or more instructions, when executed by the one or more processors, further cause the one or more processors to:
generate an index of cryptographic personal information for the set of user profiles by executing an encryption technique; and
store the set of user profiles in an anonymized format using the index of cryptographic personal information.

20. The non-transitory computer-readable medium of claim 15, where the one or more instructions, that cause the one or more processors to perform the one or more actions, cause the one or more processors to:
receive the request for information from a user device,
the request being a request to identify personal information of a particular individual of the one or more individuals,
execute an encryption technique to generate one or more cryptographic values for information included in the request,
compare each cryptographic value, of the one or more cryptographic values, to values included in an index of cryptographic personal information for the set of user profiles,
determine that the one or more cryptographic values match one or more values of the values included in the index of cryptographic personal information,
identify one or more values indicating personal information associated with a user profile, of the set of user profiles, based on determining that the one or more cryptographic values match the one or more values included in the index of cryptographic personal information, and
provide the one or more values indicating the personal information associated with the user profile for display on a user interface of the user device.

* * * * *